(12) United States Patent
Brzezinski et al.

(10) Patent No.: US 9,581,193 B2
(45) Date of Patent: Feb. 28, 2017

(54) PRESS-FIT COMBINATION BEARING

(71) Applicant: Schaeffler Technologies AG & Co. KG, Herzogenaurach (DE)

(72) Inventors: Clayton Brzezinski, Charlotte, NC (US); Seth Claus, Charlotte, NC (US); Dennis Roffe, Fort Mill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 26 days.

(21) Appl. No.: 14/707,312

(22) Filed: May 8, 2015

(65) Prior Publication Data

US 2016/0327086 A1 Nov. 10, 2016

(51) Int. Cl.
| | |
|---|---|
| *F16C 19/00* | (2006.01) |
| *F16C 19/54* | (2006.01) |
| *F16C 19/38* | (2006.01) |
| *F16C 19/48* | (2006.01) |
| *F16C 43/04* | (2006.01) |

(52) U.S. Cl.
CPC .......... *F16C 19/545* (2013.01); *F16C 19/381* (2013.01); *F16C 19/48* (2013.01); *F16C 43/04* (2013.01)

(58) Field of Classification Search
CPC ........ F16C 19/14; F16C 19/18; F16C 19/188; F16C 19/34; F16C 19/38; F16C 19/381; F16C 19/48; F16C 19/545; F16C 43/04
USPC .................................................. 384/452–455
See application file for complete search history.

(56) References Cited

U.S. PATENT DOCUMENTS

| | | | |
|---|---|---|---|
| 3,632,178 A | 1/1972 | Pitner | |
| 3,809,444 A | 5/1974 | Eckhardt et al. | |
| 3,930,692 A | 1/1976 | Condon, Jr. et al. | |
| 5,158,375 A * | 10/1992 | Uchida | F16C 19/381 |
| | | | 384/455 |
| 7,524,114 B2 | 4/2009 | Gresley | |
| 2014/0194245 A1 | 7/2014 | During et al. | |

FOREIGN PATENT DOCUMENTS

| | | |
|---|---|---|
| DE | 7129249 | 11/1971 |
| DE | 102011078775 | 1/2013 |
| DE | 102012214768 | 2/2014 |
| DE | 102012222272 | 2/2014 |
| DE | 102012217308 | 5/2014 |
| DE | 102013206680 | 10/2014 |
| FR | 2144237 | * 2/1973 |

* cited by examiner

*Primary Examiner* — James Pilkington
(74) *Attorney, Agent, or Firm* — Volpe and Koenig, P.C.

(57) ABSTRACT

A combined axial and radial bearing assembly is provided, having a radial bearing including an outer ring having a constant outside diameter, and radially inwardly extending flanges located at axial ends thereof. A radial bearing cage having an axially extended rim on a first side, and radial rolling elements therein is located within the outer ring. An axial bearing is provided including an axial bearing ring having a thrust race, and an axially extending flange connected to a radially inner end thereof. The axially extending flange has an ID that is less than the OD of the radial bearing outer ring. An axial bearing cage with thrust rolling elements located in at least some of the pockets is also provided. The axially extending flange of the axial bearing is press fit on the OD of the radial bearing outer ring in a region aligned with the axially extended rim.

8 Claims, 1 Drawing Sheet

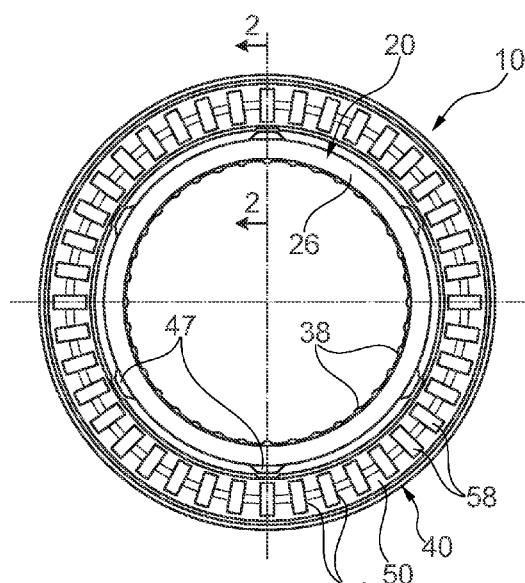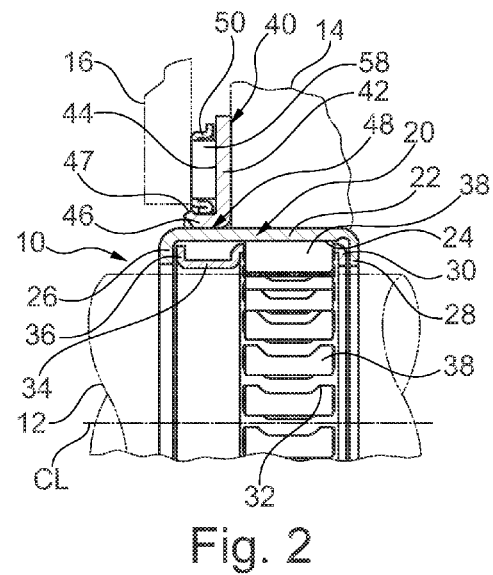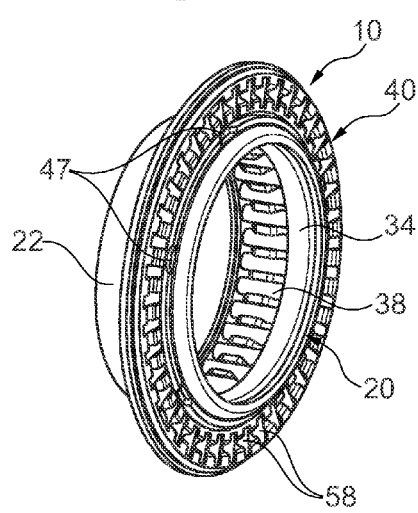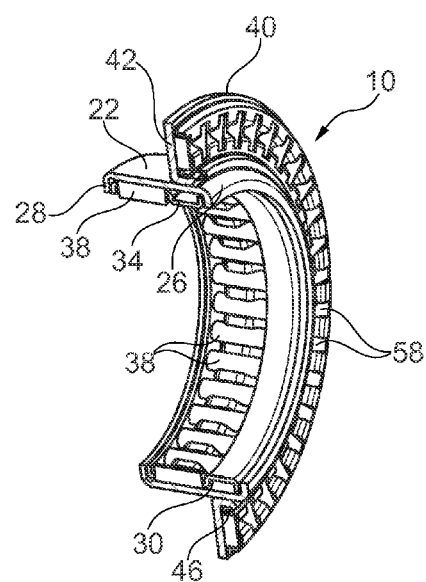
Fig. 1
Fig. 2
Fig. 3
Fig. 4

PRESS-FIT COMBINATION BEARING

FIELD OF INVENTION

This application is generally related to rolling bearings and more particularly, to combination axial and radial rolling bearing arrangements.

BACKGROUND

Combination axial and radial rolling bearing arrangements are known. These are used to carry combined radial and thrust loads for example in motor vehicle transmissions. One known prior art arrangement utilizes a one-piece cup that defines both the outer race of the radial bearing and one axial side race of the thrust bearing. However, this one-piece cup involves high costs for the required tooling and additional manufacturing steps.

It has also been known, for example as disclosed in U.S. Pat. No. 3,930,692, to form a combined radial and thrust bearing using two separate race rings, with one for the axial bearing race and the other for the radial bearing race which can be assembled together, for example via welding, a mechanical interlock, or a press fit. However, in this arrangement the radial bearing ring has a complex stepped shape in order to form the interlock connection area with the axial bearing race radially inwardly of the radial bearing race, again resulting in higher tooling costs and more complicated manufacturing due to the stepped radial bearing outer ring.

It would therefore be desirable to provide a combination axial and radial rolling bearing arrangement that reduces costs while still providing the desired functionality.

SUMMARY

In one embodiment, a combined axial and radial bearing assembly is provided, comprising a radial bearing including a radial bearing outer ring having a constant outside diameter and an inside diameter that defines an outside race, and radially inwardly extending flanges located at axial ends thereof. A radial bearing cage having rolling element pockets defined therein and an axially extended rim on a first side, with radial rolling elements located in at least some of the pockets that are arranged to roll on the outside race is located within the outer ring. An axial bearing is also provided including an axial bearing ring having a radially extending surface that defines a thrust race, and an axially extending flange connected to a radially inner end thereof. An axial bearing cage having rolling element pockets defined therein in which thrust rolling elements are located, at least some of the pockets, is also provided. The axially extending flange of the axial bearing is press fit on the outside diameter of the radial bearing outer ring in a region aligned with the axially extended rim of the radial bearing cage. This allows for simple tooling and constructions methods to form a combined radial and thrust bearing assembly.

Preferably, in a free state before the axially extending flange is press fit on the outside diameter of the radial bearing outer ring, the axially extending flange has an inside diameter that is less than the outside diameter of the radial bearing outer ring.

In one aspect, the axially extending flange has radially outwardly directed retention tabs formed thereon for retaining the axial bearing cage.

In one aspect, a radially outwardly extending flange is located on an axial end of the axially extended rim of the axial bearing cage that is guided by a first one of the radially inwardly directed flanges of the radial bearing outer ring.

In another aspect, the first one of the radially inwardly directed flanges is stamped in the radial bearing outer ring, preferably during drawing of the bearing cup.

Preferably, a second one of the radially inwardly directed flanges is roll flanged.

Preferably, the radial rolling elements and the thrust rolling elements are needles.

In another aspect, a method of assembling a combined axial and radial bearing assembly is provided in which a radial bearing and an axial bearing as discussed above are provided, and the axially extending flange of the axial bearing is press fit on the outside diameter of the radial bearing outer ring in a region aligned with the axially extended rim of the radial bearing cage.

In another aspect, the method includes forming the radial bearing outer ring as a drawn cup with a first one of the radially inwardly extending flanges formed simultaneously therewith by stamping, assembling the radial bearing cage with radial rolling elements in the drawn cup, and roll forming a second one of the radially inwardly directed flanges.

In another aspect which saves on costs, the radial bearing is preassembled and the axial bearing is preassembled.

Additional preferred arrangements of the bearing assembly having one or more features of the invention are described below and in the claims.

BRIEF DESCRIPTION OF THE DRAWINGS

The foregoing Summary as well as the following Detailed Description will be best understood when read in conjunction with the appended drawings. In the drawings:

FIG. 1 is an elevational view of a preferred embodiment of a combined axial and radial bearing.

FIG. 2 is an enlarged cross-sectional view of the combined axial and radial bearing of FIG. 1 taken along line 2-2 in FIG. 1.

FIG. 3 is a perspective view of the bearing arrangement of FIG. 1.

FIG. 4 is a partial perspective view of the combined axial and radial bearing shown in FIG. 1.

DETAILED DESCRIPTION OF THE PREFERRED EMBODIMENTS

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, c or combinations thereof. The terminology includes the words specifically noted above, derivatives thereof, and words of similar import.

Referring to FIGS. 1-4, a combined axial and radial bearing assembly 10 is shown. The bearing assembly 10 includes a radial bearing 20 combined with an axial bearing 40. The radial bearing 20 and the axial bearing 40 can be formed as two standard bearing arrangements that are joined together via a press fit in a simple operation reducing the need for complex tooling and manufacturing methods associated with the previously known one piece and two piece combined bearing arrangements.

As shown in FIGS. 2-4, the radial bearing 20 includes a radial outer bearing ring 22 having a constant outside diameter, preferably formed as a drawn cup. The inside diameter of the radial bearing outer ring 22 defines an outside race 24. Radially inwardly extending flanges 26, 28 are located at the ends thereof. The first one of the radially inwardly directed flange is 26 is preferably stamped in the radial bearing outer ring 22 during formation of the drawn cup. A radial bearing cage 30 having rolling element pockets 32 defined therein and an axially extended rim 34 located on a first side thereof is also provided. Radial rolling elements 38 are located in at least some of the pockets 32 and are arranged to roll on the outside race 24. Preferably, the radial bearing cage 30 and rollers 38 are preassembled as a unit and installed within the drawn cup that forms the radial bearing outer ring 22. The second one of the radially inwardly directed flange is 28 is then roll flanged in order to capture the radial bearing cage 30 and radial rolling elements 38. The drawn cup is preferably formed from bearing grade steel sheet that is punched and drawn and then heat treated prior to being assembled with the radial bearing cage 30 and rolling elements 38.

Still with reference to FIGS. 2-4, the axial bearing 40 includes an axial bearing ring 42 having a radially extending surface that defines a thrust race 44. An axially extending flange 46 is connected to a radially inner end 48 of the radially extending surface. The axial extending flange 46 has an inside diameter in a free state that is less than an outside diameter of the radial bearing ring 22, prior to assembly. The axial bearing ring 42 is preferably also formed from bearing grade steel sheet that is punched and heat treated. An axial bearing cage 50 having rolling element pockets 52 defined therein is provided. Thrust rolling elements 58 are located in at least some of the pockets 52 of the axial bearing cage 50. Preferably, the axial bearing cage 50 and the thrust drawing elements 58 are preassembled and are then connected to the axial bearing 40. This is preferably accomplished via radially outwardly directed retention tabs 47 being formed on the axially extending flange 46 for retaining the axial bearing cage 50 with the thrust rolling elements 58 located therein. The axial bearing 40 is preferably also a preassembled unit.

In order to form the combined axial and radial bearing assembly 10, the axially extending flange 46 of the axial bearing 40 is press fit on the outside diameter of the radial bearing outer ring 22 in a region generally aligned with the axially extended rim 34 of the radially bearing cage 30. The axially extended rim 34 is located in a region of the radial bearing outer ring 22 away from the rolling elements 38 so that distortion created via the press fit between the radial bearing outer ring 22 and the axial bearing ring 42 is spaced away from the outside race 24 where the radially rolling elements 38 roll. The press fit interference is preferably in the range of 0.0254 mm-0.0508 mm difference between the constant outside diameter of the radial bearing outer ring 22 and the inside diameter of the axially extending flange 46.

As shown in detail in FIG. 2, in one preferred arrangement, a radially outwardly extending flange 36 is located on an axial and of the axially extending rim 34 of the axial bearing cage 30. This is guided by a first one of the radially inwardly directed flanges 26 of the radial bearing outer ring 22.

In the preferred embodiment, the radial rolling elements 38 and the thrust rolling elements 58 are preferably needle rollers. The needle rollers are also preferably made from heat treated bearing grade steel.

Preferred materials for the radial bearing outer ring 22 and the axial bearing ring 42 include bearing grade steel 100Cr6, C80, or C45, which can be through hardened, or 16MnCr5, C16, or 17Cr13, which can be case hardened.

In a preferred arrangement as shown in FIG. 2, the combined axial and radial bearing assembly 10 is located on a shaft 12, shown in broken lines, which rotates about a center line CL, with the shaft 12 preferably acting as the inner race for the radial bearing 20. The axial bearing ring 42 is supported against a housing 14 on one side and the thrust rolling elements 58 contact a ring 16 on the other side, which can be connected to the shaft 12.

A preferred method for assembling the combined axial and radial bearing assembly 10 includes providing a preassembled radial bearing 20 as discussed above and providing a preassembled axial bearing 40 as discussed above. The axial extending flange 46 of the axial bearing 40 is then press fit on the outside diameter of the radial bearing outer ring 22 in a region generally aligned with the axially extended rim 34 of the radial bearing cage 30.

In a preferred arrangement, the radially bearing outer ring 22 is formed as a drawn cup with the first one of the radially inwardly extended flanges 26 being formed therewith by stamping. The radial bearing cage 30 is then assembled with the radial rolling elements 38 in the drawn cup. The cage 30 and radial rolling elements 38 can be preassembled as well and then merely dropped into the drawn cup. The second one of the radially inwardly directed flanges 28 is then roll formed in order to complete the radial bearing assembly 20.

While it is preferred that the radial bearing 20 and the axial bearing 40 be preassembled, it would also be possible to assemble the radial bearing outer ring 22 and the axial bearing ring 42 first and then install the respective cages and rollers.

Having thus described various embodiments of the present combined axial and radial roller bearing assembly 10 in detail, it is to be appreciated and will be apparent to those skilled in the art that many physical changes, only a few of which are exemplified in the detailed description above, could be made in the assembly without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed is:

1. A combined axial and radial bearing assembly, comprising:
    a radial bearing including:
        a radial bearing outer ring having a constant outside diameter and an inside diameter defining an outside race, and radially inwardly extending flanges located at axial ends thereof;
        a radial bearing cage having rolling element pockets defined therein and an axially extended rim on a first side; and
        radial rolling elements located in at least some of the pockets and arranged to roll on the outside race;
    an axial bearing including:
        an axial bearing ring having a radially extending surface that defines a thrust race, and an axially extending flange connected to a radially inner end thereof;
        an axial bearing cage having rolling element pockets defined therein; and thrust rolling elements located in at least some of the pockets of the axial bearing cage;

wherein the axially extending flange of the axial bearing is press fit on the outside diameter of the radial bearing outer ring in a region aligned with the axially extended rim of the radial bearing cage.

2. The bearing assembly of claim 1, wherein the axially extending flange has radially outwardly directed retention tabs formed thereon for retaining the axial bearing cage.

3. The bearing assembly of claim 1, further comprising a radially outwardly extending flange located on an axial end of the axially extended rim of the axial bearing cage that is guided by a first one of the radially inwardly directed flanges of the radial bearing outer ring.

4. The bearing assembly of claim 1, wherein at least one of the radially inwardly directed flanges is stamped in the radial bearing outer ring.

5. The bearing assembly of claim 1, wherein at least one of the radially inwardly directed flanges is roll flanged.

6. The bearing assembly of claim 1, wherein the radial rolling elements and the thrust rolling elements are needles.

7. A method of assembling a combined axial and radial bearing assembly, the method comprising:

providing a radial bearing including a radial bearing outer ring having a constant outside diameter and an inside diameter defining an outside race, and radially inwardly extending flanges located at axial ends thereof, a radial bearing cage having rolling element pockets defined therein and an axially extended rim on a first side, and radial rolling elements located in at least some of the pockets and arranged to roll on the outside race;

providing an axial bearing including an axial bearing ring having a radially extending surface that defines a thrust race, and an axially extending flange connected to a radially inner end thereof, the axially extending flange having an inside diameter that is less than an outside diameter of the radial bearing outer ring in a pre-assembled state, an axial bearing cage having rolling element pockets defined therein, and thrust rolling elements located in at least some of the pockets of the axial bearing cage; and press fitting the axially extending flange of the axial bearing on the outside diameter of the radial bearing outer ring in a region aligned with the axially extended rim of the radial bearing cage.

8. The method of claim 7, further comprising forming the radial bearing outer ring as a drawn cup with a first one of the radially inwardly extending flanges formed therewith by stamping, assembling the radial bearing cage with radial rolling elements in the drawn cup, and roll forming a second one of the radially inwardly directed flanges.

\* \* \* \* \*